United States Patent [19]

DeGeeter et al.

[11] 4,282,228
[45] Aug. 4, 1981

[54] ANIMAL FEED AND PROCESS

[75] Inventors: Melvin J. DeGeeter; John M. McCall, both of Kalamazoo, Mich.

[73] Assignee: The Upjohn Company, Kalamazoo, Mich.

[21] Appl. No.: 161,945

[22] Filed: Jun. 23, 1980

[51] Int. Cl.³ .................. A61K 31/505; A61K 31/54; A61K 31/44; A61K 31/445
[52] U.S. Cl. .................................. 424/251; 424/248.4; 424/248.54; 424/248.55; 424/263; 424/267
[58] Field of Search ............ 424/251, 263, 267, 248.4, 424/248.54, 248.55

[56] References Cited

U.S. PATENT DOCUMENTS

| | | | |
|---|---|---|---|
| 3,737,534 | 6/1973 | Thommen | 424/251 |
| 3,803,313 | 4/1974 | Collins | 424/251 |
| 3,870,793 | 3/1975 | Collins | 424/251 |
| 4,021,562 | 12/1975 | Lawson et al. | 424/267 |

Primary Examiner—Frederick E. Waddell
Attorney, Agent, or Firm—John J. Killinger

[57] ABSTRACT

A process for increasing production in meat-producing, egg-laying or milk-producing animals comprising feeding a compound of the formula:

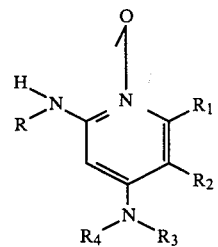

Formula I wherein R is a member selected from the group consisting of hydrogen, R₅,

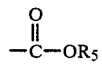

wherein R₅ is alkyl of from 1 to 8 carbon atoms, inclusive, including isomeric forms thereof, alkenyl of from 2 to 8 carbon atoms, inclusive, including isomerici forms thereof, cycloalkyl of from 3 to 7 carabon atoms; or lower acyl wherein acyl is up to and including 5 carbon atoms; R₁ is a member selected from the group consisting of R₅ and

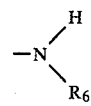

wherein R₆ is selected from the group consisting of hydrogen,

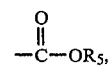

or acyl wherein acyl is up to and including 5 carbon atoms; R₂ is a member selected from the group consisting of hydrogen, R₅, bromo of chloro; R₃ and R₄ are the same or different and are selected from the group consisting of hydrogen, provided that R₃ and R₄ are not both hydrogen, R₅, cycloalkyl of from 3 to 8 carbon atoms, alkyl substituted cycloalkyl of the formula

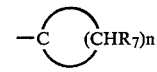

wherein n is an integer of from 2 to 7, inclusive and R₇ is a member selected from the group consisting of hydrogen and alkyl of from 1 to 5 carbon atoms, inclusive, including isomeric forms thereof; alkenyl of from 2 to 8 carbon atoms, inclusive, including isomeric forms thereof, aralkyl wherein Ar is a member selected from the group consisting of phenyl, substituted phenyl wherein 1 or 2 hydrogens are replaced with chlorine, fluorine, bromine, iodine, R₅, —OR₅, or —CF₃ and the substituents can be the same or different, and alkyl is from 1 to 4 carbon atoms, inclusive, including isomeric forms thereof, and R₃ and R₄ taken together with —N< is a heterocyclic moiety of from 4 to 8, inclusive, ring atoms and 1 or 2 hetero atoms selected from the group consisting of nitrogen, oxygen or sulfur or a substituted heterocyclic moiety wherein 0, 1, 2 or 3 of the carbon atoms of the heterocycle are substituted with R₅ in combination with a nutrient animal feed.

8 Claims, No Drawings

ANIMAL FEED AND PROCESS

DESCRIPTION

Brief Summary of the Invention

Broadly the present invention encompasses a nutritionally adequate animal feed having dispersed therein a compound of the Formula Ia and Ib in sufficient concentration to provide increasing productivity and feed efficiencies in healthy meat-producing, milk-producing or egg-laying animals. The invention also includes the process of administering the composition to meat-producing, milk-producing, egg-laying or wool-producing animals.

BACKGROUND OF THE INVENTION

It has been found in recent years that meat-producing animals will gain more weight and gain it faster when various classes of compounds such as vitamins, minerals, estrogens, antibiotics, and tranquilizers are added to the diet. Although the presently available compounds are useful, new materials are still being sought that would produce weight gains more rapidly, to a greater extent, more efficiently with respect to feed intake at a lower cost and without undesirable side effects.

DETAILED DESCRIPTION OF THE INVENTION

It is now possible by use of the present invention to obtain unexpected results in the feeding of meat-producing, milk-producing, or egg-laying animals; that is to say, an increased rate of weight gain, an increased amount of weight gain, an increase in milk production enhanced wool production, or increased rate of egg laying, as well as increased feed efficiency, can be obtained by the addition of minute quantities of a compound of the Formula I to the animals usual nutrient feed.

The active compounds pyridine oxides are represented by the structure I:

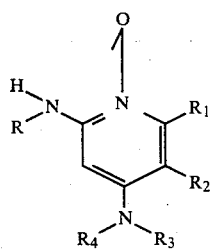

Formula I wherein R is a member selected from the group consisting of hydrogen, $R_5$,

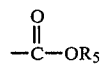

wherein $R_5$ is alkyl of from 1 to 8 carbon atoms, inclusive, including isomeric forms thereof, alkenyl of from 2 to 8 carbon atoms, inclusive, including isomeric forms thereof, cycloalkyl of from 3 to 7 carbon atoms; or lower acyl wherein acyl is up to and including 5 carbon atoms; $R_1$ is a member selected from the group consisting of $R_5$ and

wherein $R_6$ is selected from the group consisting of hydrogen,

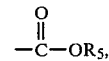

or lower acyl wherein acyl is up to and including 5 carbon atoms; $R_2$ is a member selected from the group consisting of hydrogen, $R_5$, bromo or chloro; $R_3$ and $R_4$ are the same or different and are selected from the group consisting of hydrogen, provided that $R_3$ and $R_4$ are not both hydrogen, $R_5$, cycloalkyl of from 3 to 8 carbon atoms, alkyl substituted cycloalkyl of th formula

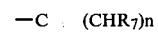

wherein n is an integer of from 2 to 7, inclusive, and $R_7$ is a member selected from the group consisting of hydrogen and alkyl of from 1 to 5 carbon atoms, inclusive, including isomeric forms thereof; alkenyl of from 2 to 8 carbon atoms, inclusive, including isomeric forms thereof, aralkyl wherein Ar is a member selected from the group consisting of phenyl, substituted phenyl wherein 1 or 2 hydrogens are replaced with chlorine, fluorine, bromine, iodine, $R_5$, —$OR_5$ or —$CF_3$ and the substituents can be the same or different, and alkyl is from 1 to 4 carbon atoms, inclusive, including isomeric forms thereof, and $R_3$ and $R_4$ taken together with —N is a heterocyclic moiety of from 4 to 8, inclusive, ring atoms and 1 or 2 hetero atoms selected from the group consisting of nitrogen, oxygen or sulfur or a substituted heterocyclic moiety wherein 0, 1, 2 or 3 of the carbon atoms of the heterocycle are substituted with $R_5$.

Compounds of the Formula I can be prepared by methods disclosed in U.S Pat. No. 4,021,562.

The pyridine oxides of Formula I are amines, and exist in the non-protonated or free base form, or in the protonated or acid addition salt form, depending on the pH of the environment. They form stable protonates, i.e., mono- or diacid addition salts, on treatment with suitable acids, for example, hydrochloric, hydrobromic, sulfuric, phosphoric, nitric, acetic, benzoic, salicylic, glycolic, succinic, nicotinic, tartaric, maleic, malic, pamoic, methanesulfonic, cyclohexanesulfamic, picric, and lactic acids, and the like.

Examples of alkyl are methyl, ethyl, propyl, butyl, pentyl, hexyl, heptyl, octyl, and isomeric forms thereof. Examples of alkenyl are allyl, 1-methylallyl, 2-methylallyl (methallyl), 2-butenyl (crotyl), 3-butenyl, 1,2-dimethylallyl, 1,1-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,1,2-trimethylallyl, 1,3-dimethyl-2-butenyl, 1-ethyl-2-butenyl, 4-methyl-2-pentenyl, 2-ethyl-2-pentenyl, 4,4-dimethyl-2-pentenyl, 2-heptenyl, 2-octenyl, 5-octenyl, 1,4-dimethyl-4-hexenyl, and the like. Examples of cycloalkyl are cyclopropyl, 2-methylcyclopropyl, 2,2-dimethylcyclopropyl, 2,3-diethylcyclopropyl, 2-butylcyclopropyl, cyclobutyl, 2-methylcyclobutyl, 3-propylcyclobutyl, 2,3,4-triethylcyclobutyl, cyclopentyl, 2,2-dimethylcyclopentyl, 3-pentylcyclopentyl, 3-tert-butylcyclopentyl, cyclohexyl, 4-tert-butylcyclohexyl, 3-isopropylcyclohexyl, 2,2-dimethylcyclohexyl, cycloheptyl, cyclooctyl, and the like. Examples of aralkyl are benzyl, phenethyl, 1-phenylethyl, 2-phenylpropyl, 4-phenylbutyl, 5-phenyl-2-methylpentyl, 1-naphthylmethyl, 2-(1-naphthyl)ethyl, 2-(2-naphthyl)ethyl, and the like. Examples of acyl are acetyl, propionyl, butanoyl, pentanoyl, and the like. Examples of alkoxycarbonyl are carbomethoxy, carboethoxy, and the like. Examples of heterocyclic moieties of the present invention are piperidino, pyrrolidinyl, morpholino, 2,4,4-trimethylazetidinyl, 2,3,4-trimethylazetidinyl, 2-methylpyrrolidinyl, 3-butylpyrrolidinyl, 2-isohexylpyrrolidinyl, 2,3-dimethylpyrrolidinyl, 2,2-dimethylpyrrolidinyl, 2,5-diethylpyrrolidinyl, 3-tert-butylpyrrolidinyl, 2,3,5-trimethylpyrrolidinyl, 3,4-dioctylpyrrolidinyl, 2-methylpiperidino, 3-methylpiperidino, 4-methylpiperidino, 3-isopropylpiperidino, 4-tert-butylpiperidino, 2-methyl-5-ethylpiperidino, 3,5-dipentylpiperidino, 2,4,6-trimethylpiperidino, 2,6-dimethylpiperidino, 2,6-dimethyl-4-octylpiperidino, 2,3,5-triethylpiperidino, 2-ethylhexahydroazepinyl, 4-tert-butylhexahydroazepinyl, 3-heptylhexahydroazepinyl, 2,4-dimethylhexahydroazepinyl, 3,3-dimethylhexahydroazepinyl, 2,4,6-tripropylhexa-hydroazepinyl, 2-methylheptamethylenimino, 5-butylheptamethylenimino, 2,4-diisopropylheptamethylenimino, 3,3-diethylheptamethylenimino, 2,5,8-trimethylheptamethylenimino, 3-methyloctamethylenimino, 2,9-diethyloctamethylenimino, 4-isooctyloctamethylenimino, 2-ethylmorpholino, 2-methyl-5-ethylmorpholino, 3,3-dimethylmorpholino, 2,6-di-tert-butylmorpholino, 4-methylpiperazinyl, 4-isopropylpiperazinyl, 2-methylaziridinyl, 2-ethylaziridinyl, 2-butylaziridinyl, 2,3-dimethylaziridinyl, 2,2-dimethylaziridinyl, 2-methylazetidinyl, 3-methylazetidinyl, 2-octylazetidinyl, 2,2-dimethylazetidinyl, 3,3-diethylazetidinyl, and the like.

Unless otherwise specified, all percentages are given on a weight-to-weight basis. The pound (lb) weights given are avoirdupois units.

Administration of the compositions of the present invention can commence for birds shortly after hatching and in the case of mammals, during the creep-feeding period of suckling animals when they are starting on solid food and, of course, after weaning. Feeding of the compositions is continued throughout the growing period, lactation period, or egg-laying period. In addition to feeding the active ingredient in combination with the feed, the active compounds can alternatively be administered in combination with the animals drinking water or in combination with a pharmaceutical carrier by injection or implantation.

The total concentration of the compound of the Formula in the feed composition is determined with regard to the species of animal, sex, age, weight, and average amount of feed consumed daily. Preferably the compound of the Formula I is employed in the finished feed that will supply the animal with a daily intake of from about 0.02 mg to about 200 mg per head, per day.

The following table illustrates the range of compound of Formula in milligrams daily dose, per head, per day for representative animals.

| Animal | Range Daily Dose/Head, mg | Preferred Daily Dose, mg |
| --- | --- | --- |
| Swine (birth to 8 weeks) | 0.5–20.0 | 10.0 |
| Swine (40 to 200 lbs) | 1.0–140.0 | 50.0 |
| Chickens (growing 0-8 weeks) | 0.02–2.0 | 0.05 |
| Hens (laying) | 0.1–2.0 | 1.0 |
| Turkeys (growing 0-24 weeks) | 0.1–5.0 | 2.0 |
| Beef Cattle (fattening) | 0.5–50.0 | 10 |
| Calves (0-12 weeks) | 1.0–40.0 | 10 |
| Dairy Cattle (lactation) | 5.0–200.0 | 10 |
| Lambs (fattening) | 1.0–20.0 | 10 |

The foregoing dosages can generally be accomplished by providing from about 50 mg to about 20,000 mg of a compound of the Formula per ton of finished feed.

Advantageously a compound of the Formula is supplied in the form of a liquid or solid premix wherein the concentration is 100–2,000 times greater than the desired final concentration in the feed. For example, the compound of Formula can be dissolved or suspended in a fluid vehicle such as corn oil, cottonseed oil, molasses, distillers solubles and the like to prepare a fluid premix. Alternatively, a solid premix can be prepared by mixing a compound of the Formula with an edible solid diluent such as sucrose, lactose, starch, corn meal, flour, calcium carbonate, soybean meal and the like.

EXAMPLE 1

A diet for fattening lambs is prepared from the following types and amounts of ingredients:

| | |
| --- | --- |
| Ground ear corn | 82.05% |
| Alfalfa meal | 10.0% |
| Soybean oil meal 44% | 7.0% |
| Ground limestone | 0.3% |
| Salt | 0.3% |
| Trace mineral mixture[1] | 0.05% |

[1]Contains the following percent of minerals: Mn, 12; Co, 0.08; Fe, 5.0; Cu, 0.4; I, 0.24; Zn, 0.7.

The above feed to be mixed, pelleted and offered to fattening lambs free-choice in conjunction with hay.

To 999 parts of the preceding feed is added 1 part of a premix composition prepared by mixing 7 gm of 2,6-diamino-3-piperidinopyridine-1-oxide with sufficient corn meal to make one pound.

The feeding composition so prepared supplies 7.0 mg of 2,6-diamino-3-piperidino-pyridine-1-oxide per pound or 15.4 parts per million.

The foregoing composition is usefully fed to lambs for increased rate of weight gain and improved utilization of feed.

EXAMPLE 2

A chicken feed for broilers is prepared from the following types and amounts of ingredients:

| | |
| --- | --- |
| Yellow corn meal | 67.35% |
| Soybean oil meal | 24.00% |
| Menhaden fish meal | 6.00% |

| | |
|---|---|
| Steamed bone meal | 1.00% |
| Ground limestone | 1.00% |
| Iodized salt | .34% |
| 25% Choline chloride | .13% |
| Vitamin $B_{12}$ supplement (6 mg/lb) | .10% |
| Manganese sulfate | .02% |
| Supplemental vitamin mix[1] | .06% |

[1]Consisting of 16.0 gm Vitamin A supplement (10 units/mg); 3.6 gm Vitamin $D_3$ supplement (15,000) units/gm); 7.1 gm riboflavin supplement (1 gm riboflavin per ounce); 500 mg niacin.

999 parts of the preceding feed is added one part of a premix composition prepared by mixing 0.08 gm of 2,6-diamino-3-piperidinopyridine-1-oxide with sufficient soybean mill feed to make one pound.

The feeding composition so prepared supplies 0.08 mg of 2,6-diamino-3-piperidinopyridine-1-oxide per pound, or about 0.18 parts per million.

The foregoing composition is usefully fed to chickens for increased rate of weight gain and improved utilization of feed. Similarly the composition can be fed to turkeys, ducks and geese.

EXAMPLE 3

A fattening feed of 800 pound yearling cattle is prepared from the following types and amounts of ingredients:

| | |
|---|---|
| Ground ear corn | 89.75% |
| Soybean oil mean, 44% | 9.0% |
| Ground limestone | 0.7% |
| Salt | 0.5% |
| Trace mineral mixture[1] | 0.05% |

[1]Contains the following percent of minerals: Mn, 12; Co, 0.08; Fe, 5.0; Cu, 0.4; I, 0.24; Zn, 0.7.

To 999 parts of the preceding feed is added one part of a premix composition prepared by mixing 0.5 gm of 2,6-diamino-3-piperidinopyridine-1-oxide with sufficient wheat flour to make one pound.

The feeding composition so prepared supplies 0.5 mg of 2,6-diamino-3-piperidinopyridine-1-oxide per pound, or about 11.0 parts per million.

Cattle are to receive the foregoing feed ad libitum together with 5 lbs. of hay, per head, per day and when so fed have an increased rate of weight gain and improved utilization of feed.

EXAMPLE 4

A swine diet for growing hogs of 40 to 100 pounds body weight is prepared from the following types and amounts of ingredients:

| | |
|---|---|
| Corn, ground | 78.15% |
| Soybean oil mean, 44% | 17.0% |
| Meat and bone scraps, 50% | 3.0% |
| Oyster shell flour | 0.4% |
| Bone meal | 0.5% |
| Salt | 0.5% |
| Trace mineral mixture[1] | 0.05% |
| Zinc oxide | 0.01% |
| Vitamin A and D Supplement[2] | 0.25% |
| Vitamin Supplement[3] | 0.25% |
| Vitamin $B_{12}$ supplement[4] | 0.09% |

[1]Contains the following % of minerals: Mn, 12; Co, 0.08; Fe, 5.0; Cu, 0.4; I, 0.24; Zn, 0.7.
[2]Contains 300 USP units $D_2$/Gm. and 1500 I.U. of A./Gm.
[3]Contains per lb.: Riboflavin, 2000 mg.; calcium pantothenate, 4000 mg.; niacin, 9000 mg.; and choline chloride 10,000 mg.
[4]Contains 6 mg. Vitamin $B_{12}$ per lb.

To 999 parts of the preceding feed is added one part of a premix composition prepared by mixing 10 mg of 2,6-diamino-3-piperidinopyridine-1-oxide with sufficient ground limestone to make one pound.

The feeding composition so prepared supplies 10 mg of 2,6-diamino-3-piperidinopyridine-1-oxide per pound or about 22 parts per million.

The foregoing composition is usefully fed to hogs for increased rate of weight gain and improved utilization of feed.

EXAMPLE 5

A regimen of 2,6-diamino-3-piperidinopyridine-1-oxide in water is prepared simply by adding the compound to the drinking water as specified below. The animals are allowed to ingest the water on an ad libitum basis

| | | mg/l |
|---|---|---|
| Swine | Birth to 8 weeks | 2.5 |
| Swine | 40–200 lb | 7.0 |
| Chickens | 0–8 weeks | 0.3 |
| Hens | | 5.0 |
| Turkeys | 0–24 weeks | 3.2 |
| Beef cattle | | 0.2 |
| Calves | 0–12 weeks | 1.0 |
| Dairy cattle | | 0.9 |
| Lambs | | 5.0 |

EXAMPLE 6

Following the procedure of the preceding Examples 1 to 5, inclusive, animal feeds are similarly prepared substituting equimolar amounts of:

2,6-diamino-4-pyrrolidinopyridine-1-oxide,
2,6-diamino-4-diethylaminopyridine-1-oxide,
2,6-diamino-4-(2-methylpiperidinopyrimidine-1-oxide,
2-amino-6-methyl-4-pyrrolidinopyrimidine 1-oxide,
2-amino-6-methyl-4-piperidinopyrimidine 1-oxide, or
2,6-diamino-4-dialkylaminopyrimidine 1-oxide, for the 2,4-diamino-6-piperidinopyrimidine-1-oxide of the example.

An added advantage was observed in the feeding of sheep. The sheep produced an increased amount of wool. This increase in wool production was attributable to the increase in body size (and weight).

We claim:

1. A process for obtaining increased production in meat-producing, egg-laying or milk-producing animals comprising feeding to said animals an effective amount of a compound of the formula Formula I

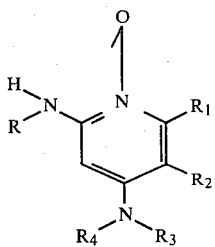

wherein R is a member selected from the group consisting of hydrogen, $R_5$,

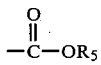

wherein $R_5$ is alkyl of from 1 to 8 carbon atoms, inclusive, including isomeric forms thereof alkenyl of from 2 to 8 carbon atoms, inclusive, and isomeric forms thereof, cycloalkyl of from 3 to 7 carbon atoms; or lower acyl wherein acyl is up to and including 5 carbon atoms; $R_1$ is a member selected from the group consisting of $R_5$ and

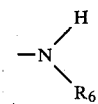

wherein $R_6$ is selected from the group consisting of hydrogen,

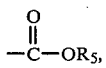

or acyl wherein acyl is up to and including 5 carbon atoms; $R_2$ is a member selected from the group consisting of hydrogen, $R_5$, bromo or chloro; $R_3$ and $R_4$ are the same or different and are selected from the group consisting of hydrogen, provided that $R_3$ and $R_4$ are not both hydrogen; $R_5$, cycloalkyl of from 3 to 8 carbon atoms, alkyl substituted cycloalkyl of the formula $$-C\quad(CHR_7)n$$

wherein n is an integer of from 2 to 7, inclusive and $R_7$ is a member selected from the group consisting of hydrogen and alkyl of from 1 to 5 carbon atoms, inclusive, including isomeric forms thereof; alkenyl of from 2 to 8 carbon atoms, inclusive, including isomeric forms thereof, aralkyl wherein Ar is a member selected from the group consisting of phenyl, substituted phenyl wherein 1 or 2 hydrogens are replaced with chlorine, fluorine, bromine, iodine, $R_5$, $-OR_5$ or $-CF_3$ and the substituents can be the same or different, and alkyl is from 1 to 4 carbon atoms, inclusive, including isomeric forms thereof; and $R_3$ and $R_4$ taken together with $-N>$ is a heterocyclic moiety of from 4 to 8, inclusive, ring atoms and 1 or 2 hetero atoms selected from the group consisting of nitrogen, oxygen or sulfur or a substituted heterocyclic moiety wherein 0, 1, 2 or 3 of the carbon atoms of the heterocycle are substituted with $R_5$ in combination with a nutrient feed.

2. The process of claim 1 where the member selected is fed in combination of from 0.001 mg to 10 mg per kilogram body weight of the animal per day.

3. The process of claim 1 where the member selected is 2,4-diamino-6-piperidinopyrimidine-3-oxide or an acid addition salt thereof.

4. The process of claim 1 wherein the animal is a meat-producing animal.

5. The process of claim 1 wherein the animal is an egg-laying animal.

6. The process of claim 1 wherein the animal is a milk-producing animal.

7. The process of claim 1 wherein the compound of the Formula I is hydrogen; $R_2$ is hydrogen; $R_1$ is amino, and $R_3$ and $R_4$ are ethyl or propyl or taken together with $-N>$ is a heterocyclic moiety of from 5 to 7 ring atoms or a substituted heterocyclic moiety wherein one or two of the carbon atoms are substituted with methyl.

8. The process of claim 1 wherein the compound of the Formula I is hydrogen; $R_2$ is hydrogen; $R_1$ is alkyl of from 1 to 8 carbon atoms, and $R_3$ and $R_4$ are ethyl or propyl or taken together with $-N>$ is a heterocyclic moiety of from 5 to 7 ring atoms or a substituted heterocyclic moiety wherein one or two of the carbon atoms are substituted with methyl.

* * * * *

UNITED STATES PATENT AND TRADEMARK OFFICE
CERTIFICATE OF CORRECTION

PATENT NO. : 4,282,228
DATED : August 4, 1981
INVENTOR(S) : Melvin J. DeGeeter and John M. McCall It is certified that error appears in the above—identified patent and that said Letters Patent is hereby corrected as shown below:

Column 2 (first page), line 26, "of chloro" should read -- or chloro --.
Column 2, line 20, "of th" should read -- of the --.
Column 2, line 25, "-C  (CHR$_7$)n" should read -- -C  (CHR$_7$)n --.
Column 5, line 14, "999 parts" should read -- To 999 parts --.
Column 8, line 4, claim 1, "-C  (CHR$_7$)n" should read -- -C  (CHR$_7$)n --.
Column 8, line 17, claim 1, "-N>" should read -- -N< --.
Column 8, line 40, claim 7, "-N>" should read -- -N< --.
Column 8, line 45, claim 8, "-N>" should read -- -N< --.

Signed and Sealed this

Nineteenth Day of January 1982

[SEAL]

Attest:

GERALD J. MOSSINGHOFF

*Attesting Officer*   *Commissioner of Patents and Trademarks*